United States Patent
Tanaka et al.

(10) Patent No.: US 9,743,011 B2
(45) Date of Patent: Aug. 22, 2017

(54) PHOTOGRAPHING APPARATUS AND METHOD

(71) Applicant: FUJIFILM Corporation, Tokyo (JP)

(72) Inventors: Yasutake Tanaka, Ashigarakami-gun (JP); Yasunori Ohta, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/840,615

(22) Filed: Aug. 31, 2015

(65) Prior Publication Data

US 2016/0094772 A1   Mar. 31, 2016

(30) Foreign Application Priority Data

Sep. 25, 2014  (JP) ................. 2014-194813

(51) Int. Cl.
| | |
|---|---|
| H04N 5/235 | (2006.01) |
| G06T 11/60 | (2006.01) |
| H04N 7/18 | (2006.01) |
| H04N 1/00 | (2006.01) |
| H04N 5/217 | (2011.01) |
| H04N 5/243 | (2006.01) |
| G06T 5/50 | (2006.01) |

(52) U.S. Cl.
CPC ............ *H04N 5/2356* (2013.01); *G06T 5/50* (2013.01); *H04N 1/00* (2013.01); *H04N 5/217* (2013.01); *H04N 5/2351* (2013.01); *H04N 5/2353* (2013.01); *H04N 5/2355* (2013.01); *H04N 5/243* (2013.01); *G06T 2207/10144* (2013.01); *G06T 2207/20221* (2013.01)

(58) Field of Classification Search
CPC ........ H04N 1/00; H04N 5/235; H04N 5/2352; H04N 5/2353; H04N 5/2354; H04N 5/2356; H04N 7/183; G06T 11/60

USPC .................. 396/161, 213, 215, 222
See application file for complete search history.

(56) References Cited

U.S. PATENT DOCUMENTS

| | | | |
|---|---|---|---|
| 6,351,286 B1 | 2/2002 | Ikami et al. | |
| 8,964,055 B2* | 2/2015 | Suzuki | H04N 5/23264 348/221.1 |
| 2007/0147706 A1* | 6/2007 | Sasaki | H04N 5/23248 382/295 |

FOREIGN PATENT DOCUMENTS

| | | |
|---|---|---|
| JP | 10-178585 A | 6/1998 |
| JP | 2009-236846 A | 10/2009 |

* cited by examiner

*Primary Examiner* — Rochelle-Ann J Blackman
(74) *Attorney, Agent, or Firm* — Birch, Stewart, Kolasch & Birch, LLP (57) ABSTRACT

There are provided a photographing apparatus and a photographing method capable of generating an added image by adding up images, the apparatus and the method achieving image quality of the added image. A photographing apparatus includes: a photographing section that photographs a subject a plurality of times sequentially; an image processing section that adds up images so as to generate an added image; and an exposure condition calculation section that calculates the minimum number of shots of the photography, which is for calculating a plurality of predetermined exposure time periods, and unit exposure time periods of the shots of the photography performed the minimum number of times, on the basis of set and input exposure conditions. The image processing section generates an added image of the plurality of exposure time periods by adding up images which are captured through the shots of the photography for the unit exposure time periods.

19 Claims, 4 Drawing Sheets

| T | 7 | 8 | 9 | 10 | 11 | 12 | 13 | 14 | 15 | 16 |
|---|---|---|---|---|---|---|---|---|---|---|
| $2^{n+1}$ | 4 | 8 | 8 | 8 | 8 | 8 | 8 | 8 | 8 | 16 |
| n | 1 | 2 | 2 | 2 | 2 | 2 | 2 | 2 | 2 | 3 |
| $T-(2^{n+1}-1)t$ | 4 | 1 | 2 | 3 | 4 | 5 | 6 | 7 | 8 | 1 |
| SHORTEST EXPOSURE TIME PERIOD (t) | 1 | 1 | 1 | 1 | 1 | 1 | 1 | 1 | 1 | 1 |
| UNIT EXPOSURE TIME PERIOD (2t) | 2 | 2 | 2 | 2 | 2 | 2 | 2 | 2 | 2 | 2 |
| UNIT EXPOSURE TIME PERIOD (4t) |   | 4 | 4 | 4 | 4 | 4 | 4 | 4 | 4 | 4 |
| UNIT EXPOSURE TIME PERIOD (8t) |   |   |   |   |   |   |   |   |   | 8 |
| UNIT EXPOSURE TIME PERIOD $(T-(2^{n+1}-1)t)$ | 4 | 1 | 2 | 3 | 4 | 5 | 6 | 7 | 8 | 1 |

PHOTOGRAPHING APPARATUS AND METHOD

CROSS-REFERENCE TO RELATED APPLICATIONS

The present application claims priority under 35 U.S.C. §119 to Japanese Patent Application No. 2014-194813, filed on Sep. 25, 2014. Each of the above application(s) is hereby expressly incorporated by reference, in its entirety, into the present application.

BACKGROUND OF THE INVENTION

1. Field of the Invention

The present invention relates to a photographing apparatus and a photographing method capable of photographing a subject, which is placed in a casing, a plurality of times sequentially and generating an added image in which images captured through the photography are added up.

2. Description of the Related Art

In the past, photographing systems, in which a subject is placed in a casing and which photograph a subject by irradiating the subject with light through a light source provided in the casing, have been utilized in various fields. In such photographing systems, a photography technique is selectively used mainly in accordance with a type of a subject. There are known photographing systems that generate images by causing an imaging element to capture chemiluminescent, fluorescent or reflected light, which originates from a subject, or transmitted light which is transmitted through the subject.

Here, in such photographing systems, if chemiluminescent or fluorescent light is photographed, an intensity of chemiluminescent light or fluorescent light emitted from a subject is weak. Accordingly, for example, in a proposal of JP1998-178585A (JP-H10-178585A), if such light is intended to be photographed, photography is performed a plurality of times sequentially, thereby generating an added image in which images captured through a plurality of shots of the photography are cumulatively added up. Further, in a proposal of JP2009-236846A, when fluorescent light is photographed, multi-exposure is performed.

SUMMARY OF THE INVENTION

However, as disclosed in JP1998-178585A (JP-H10-178585A), when images captured through a plurality of shots of the photography are added up, as the number of images added up increases, noise of the added image increases. As a result, there is a problem in that the increase in noise causes deterioration in image quality.

More specifically, when the same images are added up, noise linearly increases. However, when images photographed at different time points are added up, for example, noise obtained after n images are added up generally becomes a noise component that does not depend on frequency, and is represented by the following Expression (1).

$$\sigma = \sqrt{(\sigma_1^2 + \sigma_2^2 + \ldots + \sigma_n^2)} \qquad (1)$$

In consideration of the above problems, the present invention has an object to provide a photographing apparatus and a photographing method capable of generating an added image by adding up images sequentially photographed, the apparatus and the method achieving image quality of the added image by suppressing an increase in noise which is caused by adding up a plurality of images.

According to an aspect of the present invention, there is provided a photographing apparatus including: a photographing section that photographs a subject a plurality of times sequentially; an image processing section that adds up images sequentially captured through shots of the photography so as to generate an added image; and an exposure condition calculation section that calculates the minimum number of shots of the photography, which is for calculating a plurality of predetermined exposure time periods, and unit exposure time periods of the shots of the photography performed the minimum number of times, on the basis of set and input exposure conditions, in which the photographing section takes each shot of the photography performed the minimum number of times, for the unit exposure time period, and in which the image processing section generates the added image of the plurality of exposure time periods by adding up images which are captured through the shots of the photography for the unit exposure time periods.

In the photographing apparatus of the invention, the exposure conditions may be conditions of a shortest exposure time period of the shots of the photography and a total exposure time period in which all the exposure time periods of the shots of the photography are added up.

The photographing apparatus may further include an exposure time period receiving section that receives a setting and an input of the shortest exposure time period and the total exposure time period, as the exposure conditions.

The photographing apparatus may further include an exposure time period receiving section that receives a setting and an input of the shortest exposure time period and a ratio of the total exposure time period to the shortest exposure time period, as the exposure conditions.

The photographing apparatus may further include a signal amount receiving section that receives settings and inputs of a minimum signal amount, which is acquired by the photography, and a total signal amount, which is obtained by adding up signal amounts acquired by all the shots of the photography, as the exposure conditions, in which the exposure condition calculation section calculates the shortest exposure time period on the basis of the minimum signal amount, and calculates the total exposure time period on the basis of the total signal amount.

The photographing apparatus may further include a signal amount receiving section that receives settings and inputs of a minimum signal amount, which is acquired by the photography, and a ratio of a total signal amount, which is obtained by adding up signal amounts acquired by all the shots of the photography, to the minimum signal amount, as the exposure conditions, in which the exposure condition calculation section calculates the shortest exposure time period on the basis of the minimum signal amount, and calculates the total exposure time period on the basis of the ratio.

The exposure condition calculation section may calculate the unit exposure time periods of the shots of the photography, in which a value obtained by adding up the unit exposure time periods of the shots of the photography is equal to or less than the total exposure time period, and the minimum number of shots of the photography.

Assuming that the shortest exposure time period is t and the total exposure time period is T, the exposure condition calculation section may calculate a maximum of n satisfying $2^{n+1} t \leq T$, assuming that m is an integer of 0 to n, $2^m t$ and $T - (2^{n+1} - 1)t$ may be calculated as the plurality of unit exposure time periods, and n+2 may be calculated as the minimum number of shots of the photography, and assuming that k is an integer of 1 to (T/t), the image processing section may calculate an added image of an exposure time period of kt.

The photographing apparatus may further include a display control section that displays an image of the unit exposure time period and the added image.

The display control section may display the image of the unit exposure time period and the added image side by side.

The photographing apparatus may further include an image selection receiving section that receives selection of either image of the added image and the image of the unit exposure time period, the images being displayed side by side, in which the display control section displays the selected image in an enlarged manner.

According to another aspect of the present invention, there is provided a method of photographing a subject a plurality of times sequentially by using the photographing apparatus, the method including: calculating the minimum number of shots of the photography, which is for calculating a plurality of predetermined exposure time periods, and unit exposure time periods of the shots of the photography performed the minimum number of times, on the basis of the set and input exposure conditions; taking each shot of the photography performed the minimum number of times for the unit exposure time period of each shot of the photography; and generating an added image of the plurality of exposure time periods by adding up images which are captured through the shots of the photography for the unit exposure time periods.

In the photographing apparatus and method according to the aspects of the present invention, the subject is photographed the plurality of times sequentially, the images sequentially captured through shots of the photography are added up so as to generate the added image, and the minimum number of shots of the photography, which is for calculating the plurality of predetermined exposure time periods, and the unit exposure time period of the shots of the photography performed the minimum number of times are calculated, on the basis of set and input exposure conditions. Then, each shot of the photography performed the minimum number of times is taken for the unit exposure time period, and the added image of the plurality of exposure time periods is generated by adding up images which are captured through the shots of the photography for the unit exposure time periods. Hence, it is possible to minimize the number of shots of the photography, that is, it is possible to minimize the number of images to be added up, and thus it is possible to suppress the increase in noise caused by adding up the images. As a result, it is possible to improve image quality of the added image.

DESCRIPTION OF THE PREFERRED EMBODIMENTS

Figure 1:
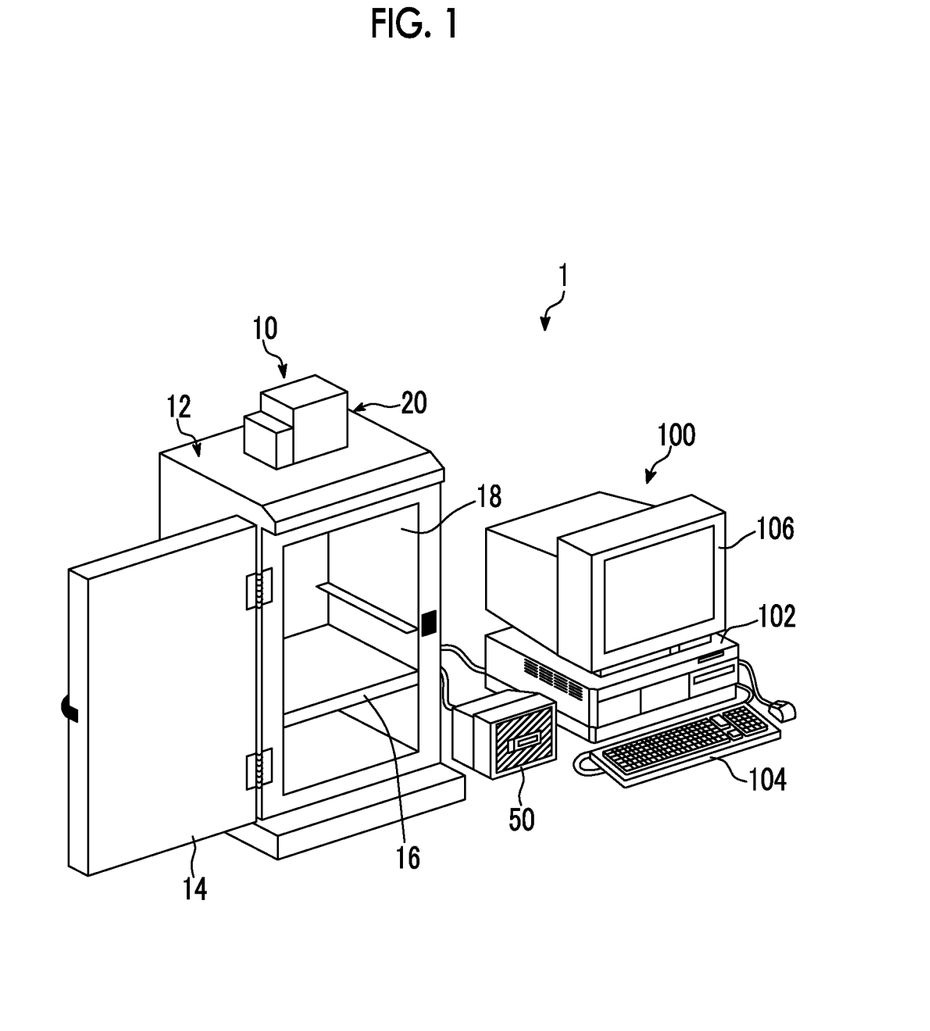
FIG. 1 is a schematic perspective view of a photographing system using a photographing apparatus according to an embodiment of the present invention.
Figure 2:
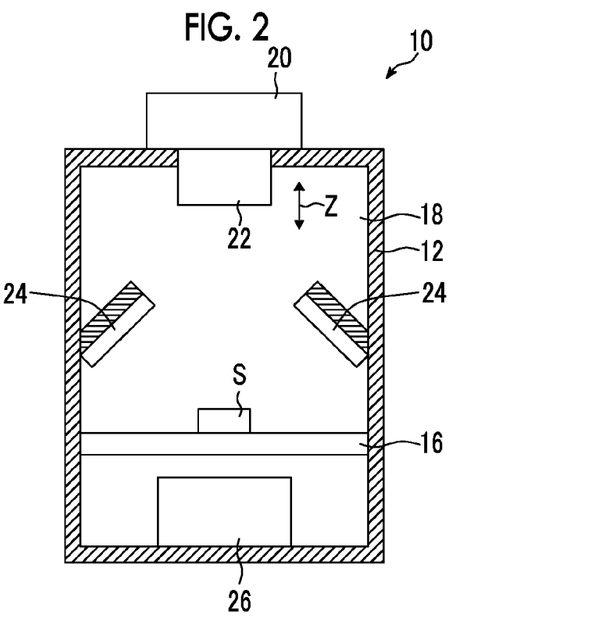
FIG. 2 is a schematic sectional view illustrating an internal configuration of the photographing apparatus according to the embodiment of the present invention.
Figure 3:
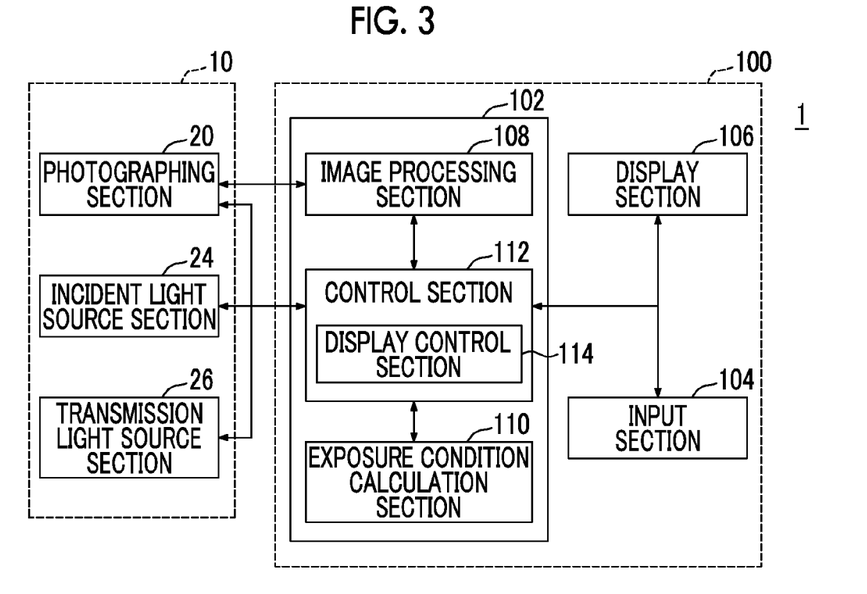
FIG. 3 is a schematic block diagram of the photographing apparatus according to the embodiment of the present invention.

Hereinafter, a photographing system 1 using a photographing apparatus and a photographing method according to an embodiment of the present invention will be described in detail with reference to drawings. FIG. 1 is a schematic perspective view illustrating a photographing system of the present embodiment. FIG. 2 is a schematic sectional view illustrating an internal configuration of a photographing apparatus of the present embodiment. FIG. 3 is a schematic block diagram illustrating the photographing system of the present embodiment.

As shown in FIGS. 1 and 2, a photographing system 1 of the present embodiment includes a dark box 10 and a photography control device 100.

The dark box 10 includes: a casing 12 that has a door 14; a stage 16 on which a subject S is provided; a photographing section 20; a lens section 22; an incident light source section 24; a transmission light source section 26; and a subject observation monitor 50.

The casing 12 has a hollow portion 18 which is a substantially rectangular parallelepiped, and the stage 16, on which the subject S is placed, is provided in the casing 12. Further, in the casing 12, the door 14 shown in FIG. 1 is mounted to be opened and closed. A user opens the door 14, places the subject S on the stage 16, and thereafter closes the door 14, whereby the subject S can be housed in the casing 12. The casing 12 constitutes a dark box by which outside light does not enter into the hollow portion 18. The stage 16 is formed of a material which transmits light originating from the transmission light source section 26.

The photographing section 20 is fixed onto an upper surface of the casing 12, and includes an imaging element such as a cooled charge coupled device (CCD) image sensor or a complementary metal oxide semiconductor (CMOS) image sensor, thereby detecting light reflected from the subject S, light emitted from the subject S, or light transmitted through the subject S, and generating an image signal. The image signal generated by the photographing section 20 is subjected to, for example, amplification processing, and is thereafter output to the photography control device 100.

The lens section 22 is mounted on the photographing section 20. The lens section 22 includes, for example, a plurality of lenses, and the lenses are provided to be movable in a direction of an arrow Z in order to bring the subject S into focus. Further, the lens section 22 also includes, for example, optical elements such as a diaphragm and an excitation light cut filter, thereby adjusting a wavelength or a light amount of the detected light.

Each of the incident light source section 24 and the transmission light source section 26 has, for example, an excitation light source for fluorescent photography and a white light source, and is configured such that the light source is switched as necessary under control of the photography control device 100. For example, if photography for detecting fluorescent light emitted from the fluorescently-labeled subject S is performed, the subject S is irradiated with excitation light originating from the incident light source section 24 or the transmission light source section 26. If photography for detecting light reflected from the subject S is performed, the subject S is irradiated with white light originating from the incident light source section 24. If photography for detecting light transmitted through the subject S is performed, the subject S is irradiated with white light originating from the transmission light source section 26.

The subject observation monitor 50 displays a state on the stage 16 which is photographed by a small camera (not shown) provided on the upper side of the casing 12. Thereby, by checking a height of the stage 16 or a position of the subject S placed on the stage 16, the height of the stage or the position of the subject can be adjusted such that the subject S is placed appropriately for the photography.

The photography control device 100 is formed of, for example, a personal computer, and includes a control device main body 102, an input section 104, and a display section 106. The photography control device 100 controls operations of the photographing section 20, the incident light source section 24, and the transmission light source section 26 belonging to the dark box 10. The dark box 10 is controlled by the photography control device 100, thereby photographing the subject S. In the present embodiment, the photographing apparatus of the present invention includes the photographing section 20 in the dark box 10, and an exposure condition calculation section 110 and an image processing section 108 of the photography control device 100.

Since the photographing system 1 of the present embodiment has the above-mentioned configuration, it is possible to perform photography using four photography techniques in accordance with a purpose of the photography or a type of a subject. The four photography techniques include: a photography technique (hereinafter referred to as a first photography technique) of detecting chemiluminescent light emitted from a subject; a photography technique (hereinafter referred to as a second photography technique) of detecting fluorescent light emitted from a subject; a photography technique (hereinafter referred to as a third photography technique) of detecting reflected light which is reflected from a subject; and a photography technique (hereinafter referred to as a fourth photography technique) of detecting transmitted light which is transmitted through a subject.

In the first photography technique, when subject molecules excited by chemical reaction return to a ground state, a phenomenon (chemiluminescence), in which energy is emitted as light, is used. Thereby, it is possible to perform, for example, genetic analysis, research, and tests on biological tissue for disorders and aging, evaluation of deterioration in organic compounds and polymer compounds, and the like. For example, a labeling substance, which causes chemiluminescence if the substance comes into contact with a chemiluminescence substrate, may label a photographic subject substance in a subject, and may thereafter generate chemiluminescent light by bringing the chemiluminescence substrate into contact with the labeling substance. It should be noted that, in the first photography technique, irradiation of light emitted from the incident light source section 24 and the transmission light source section 26 is not performed.

In the second photography technique, excitation light is emitted from the incident light source section 24 or the transmission light source section 26, and fluorescent light, which is emitted from the fluorescent substance labeling the photographic subject substance in a subject, is detected. As the subject of the second photography technique, for example, there is a gel support including deoxyribonucleic acid (DNA) fragments which are fluorescently labeled and separated by electrophoresis. Using this photographing system 1, distribution of DNA fragments in the gel support can be visualized as an image, and can be evaluated.

In the third photography technique, for example, white light is emitted as illumination light from the incident light source section 24, and reflected light, which is reflected from a subject under the illumination light, is detected. Thereby, it is possible to obtain a digital image by photoelectrically reading a reflective original such as a photo. Further, in the fourth photography technique, for example, white light is emitted as illumination light from the transmission light source section 26, and transmitted light, which is transmitted through a subject under the illumination light, is detected. Thereby, it is possible to obtain a digital image by photoelectrically reading a transparent original such as a film.

Here, in the above-mentioned first or second photography technique, the photographing system 1 of the present embodiment captures chemiluminescent light or fluorescent light emitted from the subject S. However, the intensity of such light is weak. Accordingly, if chemiluminescent light or fluorescent light is intended to be photographed, the photographing system 1 of the present embodiment performs photography a plurality of times sequentially, thereby generating an added image in which the images captured through a plurality of shots of the photography are cumulatively added up. Consequently, if chemiluminescent light or fluorescent light is intended to be photographed, the photography control device 100 of the present embodiment controls the photographing section 20 of the dark box 10 such that it performs photography a plurality of times sequentially as described above.

The control device main body 102 includes, as shown in FIG. 3, the image processing section 108, the exposure condition calculation section 110, and a control section 112.

The image processing section 108 receives an input of image signals which are output from the photographing section 20, and performs signal processing (such as noise removal processing or sharpness processing) required for the image signals. Further, if chemiluminescent light or fluorescent light emitted from a subject is intended to be photographed, the image processing section 108 of the present embodiment generates added image signal by cumulatively adding up image signals of the images which are sequentially photographed by the photographing section 20.

Here, the image processing section 108 of the present embodiment is able to acquire an image signal of an image, of which the luminance changes stepwise, by cumulatively adding up the image signals, as described above. For example, a user may intend to acquire image signals of images which are captured by increasing the exposure time period in increments of 1 second in a range of 1 to 10 seconds, that is, may intend to acquire image signals of images which correspond to 1, 2, 3, 4, 5, . . . 10 seconds. In this case, the image signals are acquired by cumulatively adding up the image signals of the images captured through 10 shots of photography which are sequentially taken and each of which is taken for an exposure time period of 1 second.

For example, if an added image signal of an exposure time period of 10 seconds is acquired, it is necessary to cumulatively add up 10 image signals. However, as described above, as the number of image signals added up increases, noise also increases. As a result, image quality deteriorates. That is, when noise components superimposed in image signals of 1, 2, 3, 4, 5, . . . 10 seconds are respectively indicated by $\sigma_1, \sigma_2, \sigma_3, \sigma_4, \sigma_5, \ldots \sigma_{10}$, a noise component $\sigma$ superimposed in the added image signal is represented by the following Expression (2).

$$\sigma = \sqrt{(\sigma_1^2 + \sigma_2^2 + \sigma_3^2 + \sigma_4^2 + \sigma_5^2 \ldots + \sigma_{10}^2)} \qquad (2)$$

When the image signals are added up, a plurality of images photographed at the same time may be added up. This situation further deteriorates noise, and is thus not preferable. For example, in order to acquire the added image signal of the exposure time period of 10 seconds, image signals of 10 images, each of which is photographed once for an exposure time period of 1 second, may be added up. In this case, when a noise component superimposed in the image signal of the image photographed once for the exposure time period of 1 second is indicated by $\sigma_1$, the noise component $\sigma$ superimposed in the added image signal is represented by the following Expression (3).

$$\sigma = 10\sigma_1 \tag{3}$$

Therefore, the exposure condition calculation section 110 of the present embodiment does not add up the same images. The exposure condition calculation section 110 of the present embodiment minimizes the number of shots of the photography when acquiring the added image signal by adding up the image signals acquired by the plurality of shots of the photography, and calculates the minimum number of shots of the photography and the exposure time periods of the shots of the photography so as to acquire an image signal of an exposure time period which is desired by a user. It should be noted that the calculated exposure time period of each shot of the photography is referred to as a unit exposure time period. Further, a method of calculating the minimum number of shots of the photography and the unit exposure time period will be described later in detail.

The control section 112 includes, for example, a central processing unit (CPU), a read only memory (ROM), and the like. The control section 112 integrally controls operations of the respective sections in the dark box 10 and the photography control device 100. In particular, if chemiluminescent or fluorescent light is intended to be captured, the control section 112 of the present embodiment controls, as described above, the photographing section 20 of the dark box 10 so as to sequentially perform photography a plurality of times. The control section 112 includes a display control section 114. The display control section 114 causes the display section 106 to display the above-mentioned added image and the like.

The display section 106 is formed of a display apparatus such as a cathode ray tube (CRT) display or a liquid crystal display, and displays the added image which is generated by the image processing section 108 as described above. Further, the display section 106 displays a setting screen for giving an instruction or performing various kinds of setting on the respective sections of the dark box 10.

The input section 104 includes a mouse, a keyboard, and the like. A user gives an instruction or performs various kinds of setting on the respective sections of the dark box 10 by using the input section 104. In particular, in the present embodiment, the input section 104 receives settings and inputs of the shortest exposure time period and the total exposure time period. The shortest exposure time period and the total exposure time period will be described later in detail. Further, in the present embodiment, the input section 104 corresponds to the exposure time period receiving section of the present invention.

Figure 4:
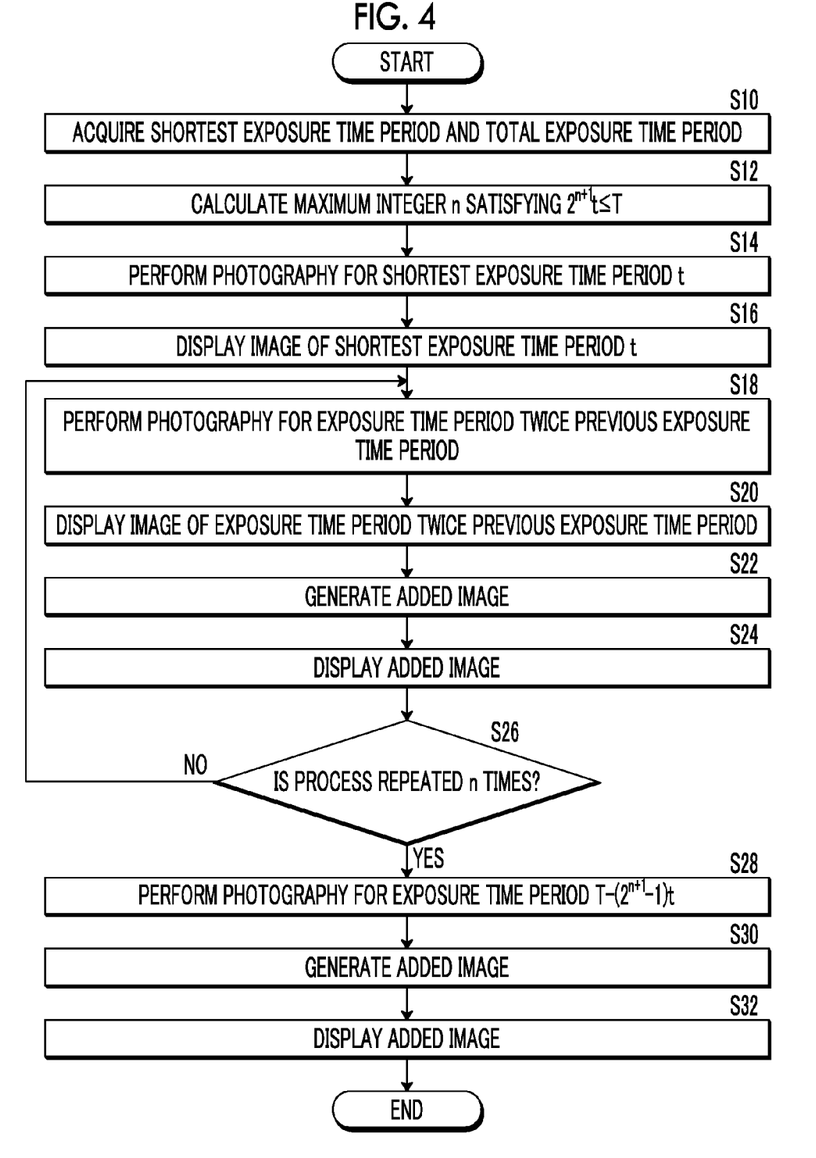
FIG. 4 is a flowchart illustrating effects of a photographing system using a photographing apparatus according to an embodiment of the present invention.

Next, the operations of the photographing system 1 of the present embodiment will be described with reference to the flowchart shown in FIG. 4. In addition, a description will be given focusing on the above-mentioned method of calculating the minimum number of shots of the photography and the exposure time periods of the shots of the photography in a case of calculating the added image when the photographing system 1 of the present embodiment captures the chemiluminescent or fluorescent light.

First, a user sets and inputs the desired shortest exposure time period and the desired total exposure time period by using the input section 104. In addition, the shortest exposure time period is an exposure time period which is used when photographing an image corresponding to the shortest exposure time period or the smallest signal amount among images of exposure time periods or signal amounts desired by a user. Further, the total exposure time period is a time period which is obtained by adding up the exposure time periods of all shots of the photography.

Then, in the present embodiment, images of exposure time periods, which increase in increments of the shortest exposure time period t, that is, images of the exposure time periods t, 2t, 3t, 4t, . . . are acquired and displayed. Among the exposure time periods t, 2t, 3t, 4t, exposure time periods, which are not included in the unit exposure time period to be described later, are a plurality of predetermined exposure time periods described in the present invention.

Subsequently, the shortest exposure time period and the total exposure time period received through the input section 104 are acquired by the exposure condition calculation section 110 (S10).

The exposure condition calculation section 110 calculates the minimum number of shots of the photography, which is for calculating a plurality of preset exposure time periods, and the unit exposure time periods of the shots of the photography, on the basis of the shortest exposure time period and the total exposure time period.

Specifically, the exposure condition calculation section 110 first calculates a maximum integer n, which satisfies the following Expression (4), on the basis of the shortest exposure time period t and the total exposure time period T.

$$2^{n+1} t \leq T \tag{4}$$

Figure 5:
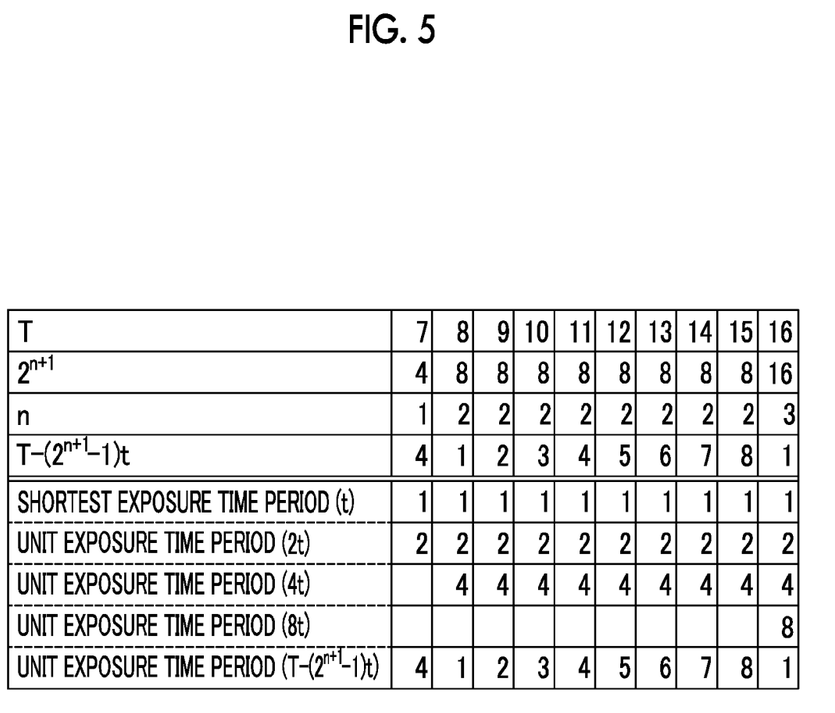
FIG. 5 is a table showing unit exposure time periods of shots of the photography when the shortest exposure time period t is set to 1 second and the total exposure time period T is set as a value of 7 to 16 seconds.

A table of FIG. 5 shows the unit exposure time periods of the shots of the photography when the shortest exposure time period t is set to 1 second and the total exposure time period T is set as a value of 7 to 16 seconds. Further, the table of FIG. 5 shows the above-mentioned value of n required in a process of the calculation, a value of $2^{n+1}$ in the above Expression (4), and a value of $T-(2^{n+1}-1)t$. For example, if 10 seconds are set as the total exposure time period T, the maximum integer n satisfying the above Expression (4) is 2. Finally, n+2, which is a value obtained by adding 2 to the value of n, is the minimum number of shots of the photography. Therefore, as described above, the minimum number of shots of the photography is calculated by calculating n.

Next, the shortest exposure time period t, which is set and input by a user, is output from the exposure condition calculation section 110 to the control section 112. The control section 112 controls the photographing section 20 on the basis of the input shortest exposure time period, and the photographing section 20 performs photography for the shortest exposure time period t (S14). The image signal of the image photographed for the shortest exposure time period t is output from the photographing section 20 to the image processing section 108, and is stored therein. Then, the display control section 114 reads out the image signal of the shortest exposure time period t, and displays the image corresponding to the shortest exposure time period t on the display section 106 (S16).

Next, in the exposure condition calculation section 110, the exposure time period 2t, which is twice the shortest exposure time period t, is calculated as the unit exposure time period, and is output to the control section 112. The control section 112 controls the photographing section 20 on the basis of the input unit exposure time period 2t, and the photographing section 20 performs photography for the unit exposure time period 2t (S18). The image signal of the image photographed for the unit exposure time period 2t is output from the photographing section 20 to the image processing section 108, and is stored therein. Then, the display control section 114 reads out the image signal of the unit exposure time period 2t, and additionally displays the image corresponding to the unit exposure time period 2t on the display section 106 (S20).

At this time, the image processing section 108 adds up the previously stored image signal of the shortest exposure time period t and the currently stored image signal of the unit exposure time period 2t, thereby generating and storing the added image signal of the exposure time period 3t (S22). Then, the display control section 114 reads out the image signal of the exposure time period 3t, and displays the image corresponding to the exposure time period 3t on the display section 106 (S24).

Next, the exposure condition calculation section 110 checks whether or not the process of calculating the exposure time period twice the previous exposure time period in S18 is repeated n times. If the process is not repeated n times (S26, NO), the procedure returns to S18, and the exposure condition calculation section 110 calculates the exposure time period which is twice the previous exposure time period. That is, if the previous exposure time period is 2t, the exposure time period 4t is calculated as the unit exposure time period, and is output to the control section 112.

The control section 112 controls the photographing section 20 on the basis of the input unit exposure time period 4t, and the photographing section 20 performs photography for the unit exposure time period 4t (S18). The image signal of the image photographed for the unit exposure time period 4t is output from the photographing section 20 to the image processing section 108, and is stored therein. Then, the display control section 114 reads out the image signal of the unit exposure time period 4t, and additionally displays the image corresponding to the unit exposure time period 4t on the display section 106 (S20).

At this time, the image processing section 108 respectively adds the image signal of the shortest exposure time period t, the image signal of the unit exposure time period 2t, and the added image signal of the exposure time period 3t, the signals being stored until the current time, to the image signal of the unit exposure time period 4t, which is currently stored, thereby generating and storing the added image signals of the exposure time period 5t, the exposure time period 6t, and the exposure time period 7t (S22). Then, the display control section 114 reads out the image signals of the unit exposure time period 4t, the exposure time period 5t, the exposure time period 6t, and the exposure time period 7t, and causes the display section 106 to additionally display the added images thereof (S24). In such a manner, until the process of calculating the exposure time period twice the previous exposure time period is repeated n times, the processes of S18 to S24 are repeatedly performed (S26).

Subsequently, if the process is repeated n times, the exposure condition calculation section 110 calculates the exposure time period $T-(2^{n+1}-1)t$ as the unit exposure time period, and outputs the time period to the control section 112. The control section 112 controls the photographing section 20 on the basis of the input unit exposure time period $T-(2^{n+1}-1)t$, and the photographing section 20 performs photography for the unit exposure time period $T-(2^{n+1}-1)t$ (S28). The image signal of the image photographed for the unit exposure time period $T-(2^{n+1}-1)t$ is output from the photographing section 20 to the image processing section 108, and is stored therein.

At this time, the image processing section 108 adds up the image signal of the shortest exposure time period t, the image signal of the unit exposure time period 2t, 4t, ..., $2^n$t, and the image signal of the unit exposure time period $T-(2^{n+1}-1)t$, the signals being stored until the current time, thereby generating the added image signal until it reaches an added image signal of the exposure time period equal to the total exposure time period T. For example, if the total exposure time period T is 10t, the added image signal of the exposure time period 8t, the exposure time period 9t, and the exposure time period 10t is generated (S30).

Then, the display control section 114 reads out the added image signal of the exposure time period equal to the total exposure time period T, and causes the display section 106 to additionally display the added image (S32).

By performing the above-mentioned processes, finally, the images of the exposure time periods t, 2t, 3t, ..., T can be displayed side by side on the display section 106.

Consequently, in the photographing system 1 of the embodiment, shots of the photography for the shortest exposure time period t and the unit exposure time periods 2t, 4t, ... $2^n$t, $T-(2^{n+1}-1)t$ are taken, and the images captured through the shots of the photography are added up. Thereby, the images, which are captured for time periods increasing in increments of the shortest exposure time period t, and the image of the exposure time period equal to the total exposure time period can be generated and displayed.

Hereinafter, a description will be given of generation of images of exposure time periods when the shortest exposure time period t is set to 1 second and the total exposure time period T is set to 10 seconds, with reference to the table of FIG. 5.

In this case, first, on the basis of the above Expression (4), the value of n is calculated as 2, and the process of calculating the exposure time period twice the previous exposure time period is repeated twice, whereby the unit exposure time periods are calculated as 2 seconds and 4 seconds. Further, by calculating the exposure time period $T-(2^{n+1}-1)t$, the unit exposure time period is calculated as 3 seconds.

Then, photography is performed for the shortest exposure time period of 1 second, photography is performed for the unit exposure time periods of 2 seconds and 4 seconds, and the image signals obtained by the photography are combined and added up. Thereby, images of exposure time periods of 2, 3 (calculated by 1+2 seconds), 4, 5 (calculated by 1+4 seconds), 6 (calculated by 2+4 seconds), and 7 seconds (calculated by 1+2+4 seconds) are acquired and displayed. Finally, by calculating the exposure time period $T-(2^{n+1}-1)t$, the unit exposure time period is calculated as 3 seconds. Then, the image signal obtained through photography of the unit exposure time period of 3 seconds, the image signal of the shortest exposure time period of 1 second, and the image signals of the unit exposure time periods of 2 and 4 seconds, the image signals being obtained by performing photography until then, are added up. Thereby, image signals of exposure time periods of 8 (calculated by 1+3+4 seconds), 9 (calculated by 2+4+3 seconds), and 10 seconds (calculated by 1+2+4+3 seconds) are acquired and displayed.

In the photographing system 1 of the embodiment, when the images of the exposure time periods t, 2t, 3t, ..., T are displayed on the display section 106, it is preferable that the images are displayed side by side on a single screen.

Thereby, it is possible to compare the images, and a user is able to find an image of an optimum exposure time period.

As described above, when a user finds the image of the optimum exposure time period, the user may select the image through the input section 104, and the display control section 114 may cause the display section 106 to display the selected image in an enlarged manner. In this case, the input section 104 corresponds to the image selection receiving section of the present invention.

In the photographing system 1 of the embodiment, a user sets and inputs the shortest exposure time period and the total exposure time period through the input section 104, and the present invention is not limited to this. Instead of the total exposure time period, a ratio of the total exposure time period to the shortest exposure time period (T/t) may be set and input. The exposure condition calculation section 110 acquires the ratio and the shortest exposure time period received through the input section 104. The exposure condition calculation section 110 calculates the total exposure time period on the basis of the ratio, and calculates the minimum number of shots of the photography and the unit exposure time periods by using the total exposure time period and the shortest exposure time period, as described above.

In the photographing system 1 of the embodiment, a user sets and inputs the shortest exposure time period and the total exposure time period through the input section 104. However, instead of such exposure time periods, the minimum signal amount obtained by the photography and the total signal amount obtained by all shots of the photography may be set and input. The exposure time periods of shots of photography correspond to the signal amounts obtained through the shots of the photography. Consequently, as the exposure time period increases, the signal amount also increases. Therefore, instead of receiving settings and inputs of the exposure time periods, the settings and the inputs of the signal amounts may be received.

The exposure condition calculation section 110 acquires the minimum signal amount and the total signal amount received through the input section 104. Then, the exposure condition calculation section 110 converts the minimum signal amount into the shortest exposure time period on the basis of a preset conversion expression, and converts the total signal amount into the total exposure time period. Then, by using the exposure time periods, the exposure condition calculation section 110 calculates the minimum number of shots of the photography and the unit exposure time periods, as described above. In this case, the input section 104 corresponds to the signal amount receiving section of the present invention.

In a manner similar to the case of setting and inputting the ratio of the total exposure time period to the shortest exposure time period (T/t), instead of the total exposure time period, the signal amount may be input. Even in this case, instead of the total signal amount, the ratio of the total signal amount to the minimum signal amount may be set and input. The exposure condition calculation section 110 acquires the ratio and the minimum signal amount received through the input section 104. The exposure condition calculation section 110 calculates the total signal amount on the basis of the ratio, calculates the total exposure time period and the shortest exposure time period on the basis of the total signal amount and the minimum signal amount, and calculates the minimum number of shots of the photography and the unit exposure time periods on the basis of the exposure time periods, as described above.

What is claimed is:

1. A photographing apparatus comprising:
   a photographing section that photographs a subject a plurality of times sequentially;
   an image processing section that adds up images sequentially captured through shots of the photography so as to generate an added image; and
   an exposure condition calculation section that calculates the minimum number of shots of the photography, which calculates a plurality of mutually different predetermined exposure time periods, and at least two kinds of unit exposure time periods used for the respective shots of the photography performed the minimum number of times, on the basis of set and input exposure conditions,
   wherein the photographing section takes each shot of the photography that is performed with the minimum number of times, using the at least two kinds of unit exposure time periods, and
   wherein the image processing section generates a plurality of the added images which have the plurality of mutually different exposure time periods by adding up images without weighting which are captured through the shots of the photography using the at least two kinds of unit exposure time periods in different combinations so that the exposure time period of the added image is longer than the unit exposure times of the images that are added for the added image.

2. The photographing apparatus according to claim 1, wherein the exposure conditions are conditions of a shortest exposure time period of the shots of the photography and a total exposure time period in which all the exposure time periods of the shots of the photography are added up.

3. The photographing apparatus according to claim 2, further comprising an exposure time period receiving section that receives a setting and an input of the shortest exposure time period and the total exposure time period, as the exposure conditions.

4. The photographing apparatus according to claim 2, wherein the exposure condition calculation section calculates the unit exposure time periods of the shots of the photography, in which a value obtained by adding up the unit exposure time periods of the shots of the photography is equal to or less than the total exposure time period, and the minimum number of shots of the photography.

5. The photographing apparatus according to claim 4,
   wherein assuming that the shortest exposure time period is t and the total exposure time period is T, the exposure condition calculation section calculates a maximum of n satisfying $2^{n+1}t \leq T$,
   wherein assuming that m is an integer of 0 to n, $2^m t$ and $T-(2^{n+1}-1)t$ are calculated with respect to all values of m as the plurality of unit exposure time periods, and n+2 are calculated as the minimum number of shots of the photography, and
   wherein assuming that k is an integer of 1 to (T/t), the image processing section calculates added images of an exposure time period of kt with respect to all the plurality of mutually different predetermined exposure time periods.

6. The photographing apparatus according to claim 3, wherein the exposure condition calculation section calculates the unit exposure time periods of the shots of the photography, in which a value obtained by adding up the unit exposure time periods of the shots of the photography is equal to or less than the total exposure time period, and the minimum number of shots of the photography.

7. The photographing apparatus according to claim 6,
wherein assuming that the shortest exposure time period is t and the total exposure time period is T, the exposure condition calculation section calculates a maximum of n satisfying $2^{n+1}t \le T$,
wherein assuming that m is an integer of 0 to n, $2^m t$ and $T-(2^{n+1}-1)t$ are calculated with respect to all values of m as the plurality of unit exposure time periods, and n+2 are calculated as the minimum number of shots of the photography, and
wherein assuming that k is an integer of 1 to (T/t), the image processing section calculates added images of an exposure time period of kt with respect to all the plurality of mutually different predetermined exposure time periods.

8. The photographing apparatus according to claim 2, further comprising an exposure time period receiving section that receives a setting and an input of the shortest exposure time period and a ratio of the total exposure time period to the shortest exposure time period, as the exposure conditions.

9. The photographing apparatus according to claim 8, wherein the exposure condition calculation section calculates the unit exposure time periods of the shots of the photography, in which a value obtained by adding up the unit exposure time periods of the shots of the photography is equal to or less than the total exposure time period, and the minimum number of shots of the photography.

10. The photographing apparatus according to claim 9,
wherein assuming that the shortest exposure time period is t and the total exposure time period is T, the exposure condition calculation section calculates a maximum of n satisfying $2^{n+1}t \le T$,
wherein assuming that m is an integer of 0 to n, $2^m t$ and $T-(2^{n+1}-1)t$ are calculated with respect to all values of m as the plurality of unit exposure time periods, and n+2 are calculated as the minimum number of shots of the photography, and
wherein assuming that k is an integer of 1 to (T/t), the image processing section calculates added images of an exposure time period of kt with respect to all the plurality of mutually different predetermined exposure time periods.

11. The photographing apparatus according to claim 2, further comprising a signal amount receiving section that receives settings and inputs of a minimum signal amount, which is acquired by the photography, and a total signal amount, which is obtained by adding up signal amounts acquired by all the shots of the photography, as the exposure conditions,
wherein the exposure condition calculation section calculates the shortest exposure time period on the basis of the minimum signal amount, and calculates the total exposure time period on the basis of the total signal amount.

12. The photographing apparatus according to claim 11, wherein the exposure condition calculation section calculates the unit exposure time periods of the shots of the photography, in which a value obtained by adding up the unit exposure time periods of the shots of the photography is equal to or less than the total exposure time period, and the minimum number of shots of the photography.

13. The photographing apparatus according to claim 12,
wherein assuming that the shortest exposure time period is t and the total exposure time period is T, the exposure condition calculation section calculates a maximum of n satisfying $2^{n+1}t \le T$,
wherein assuming that m is an integer of 0 to n, $2^m t$ and $T-(2^{n+1}-1)t$ are calculated with respect to all values of m as the plurality of unit exposure time periods, and n+2 are calculated as the minimum number of shots of the photography, and
wherein assuming that k is an integer of 1 to (T/t), the image processing section calculates added images of an exposure time period of kt with respect to all the plurality of mutually different predetermined exposure time periods.

14. The photographing apparatus according to claim 2, further comprising a signal amount receiving section that receives settings and inputs of a minimum signal amount, which is acquired by the photography, and a ratio of a total signal amount, which is obtained by adding up signal amounts acquired by all the shots of the photography, to the minimum signal amount, as the exposure conditions,
wherein the exposure condition calculation section calculates the shortest exposure time period on the basis of the minimum signal amount, and calculates the total exposure time period on the basis of the ratio.

15. The photographing apparatus according to claim 14, wherein the exposure condition calculation section calculates the unit exposure time periods of the shots of the photography, in which a value obtained by adding up the unit exposure time periods of the shots of the photography is equal to or less than the total exposure time period, and the minimum number of shots of the photography.

16. The photographing apparatus according to claim 15,
wherein assuming that the shortest exposure time period is t and the total exposure time period is T, the exposure condition calculation section calculates a maximum of n satisfying $2^{n+1}t \le T$,
wherein assuming that m is an integer of 0 to n, $2^m t$ and $T-(2^{n+1}-1)t$ are calculated with respect to all values of m as the plurality of unit exposure time periods, and n+2 are calculated as the minimum number of shots of the photography, and
wherein assuming that k is an integer of 1 to (T/t), the image processing section calculates added images of an exposure time period of kt with respect to all the plurality of mutually different predetermined exposure time periods.

17. A photographing apparatus comprising:
a photographing section that photographs a subject a plurality of times sequentially;
an image processing section that adds up images sequentially captured through shots of the photography so as to generate an added image;
an exposure condition calculation section that calculates the minimum number of shots of the photography, which is for calculating a plurality of predetermined exposure time periods, and unit exposure time periods of the shots of the photography performed the minimum number of times, on the basis of set and input exposure conditions; and
a display control section that displays an image of the unit exposure time period and the added image,
wherein the photographing section takes each shot of the photography that is performed with the minimum number of times, for the unit exposure time period,
wherein the image processing section generates the added image of the plurality of exposure time periods by adding up images without weighting which are captured through the shots of the photography for the unit exposure time periods so that the exposure time period of the added image is longer than the unit exposure times of the images that are added for the added image, and wherein the display control section displays the image of the unit exposure time period and the added image side by side.

18. The photographing apparatus according to claim 17, further comprising an image selection receiving section that receives selection of either image of the added image and the image of the unit exposure time period, the images being displayed side by side, wherein the display control section displays the selected image in an enlarged manner.

19. A method of photographing a subject a plurality of times sequentially by using the photographing apparatus according to claim 1, the method comprising:

calculating the minimum number of shots of the photography, which calculates a plurality of mutually different predetermined exposure time periods, and at least two kinds of unit exposure time periods used for the respective shots of the photography performed the minimum number of times, on the basis of the set and input exposure conditions;

taking each shot of the photography that is performed with the minimum number of times, using at least two kinds of the unit exposure time periods; and generating a plurality of the added images which have the plurality of mutually different exposure time periods by adding up images without weighting which are captured through the shots of the photography for using the at least two kinds of unit exposure time periods in different combinations so that the exposure time period of the added image is longer than the unit exposure times of the images that are added for the added image.

* * * * *